United States Patent
Abend et al.

(10) Patent No.: US 6,750,280 B1
(45) Date of Patent: Jun. 15, 2004

(54) THERMOSETTING COMPOSITIONS BASED ON POLYMERS CONTAINING ACID ANHYDRIDE GROUPS

(75) Inventors: Thomas Abend, St-Gallen (CH); Jean-Michel Pierrot, Grosley sur Risle (FR); Patrice Robert, Beaumont le Roger (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/869,762

(22) PCT Filed: Feb. 4, 2000

(86) PCT No.: PCT/EP00/00934

§ 371 (c)(1),
(2), (4) Date: Aug. 27, 2001

(87) PCT Pub. No.: WO00/49083

PCT Pub. Date: Aug. 24, 2000

(30) Foreign Application Priority Data

Feb. 16, 1999 (EP) .............................................. 99400359

(51) Int. Cl.$^7$ ................................................. C08K 5/04
(52) U.S. Cl. ............... 524/398; 474/102 R; 474/102 C; 428/36.9; 524/59; 524/400; 524/405; 524/413; 524/417; 524/423; 524/430; 524/433; 524/436; 524/437; 524/492; 524/493
(58) Field of Search ................................. 524/430, 433, 524/413, 423, 436, 417, 398, 400, 405, 59, 437, 492, 493; 174/102 R, 102 C; 428/36.9

(56) References Cited

U.S. PATENT DOCUMENTS

| | | | |
|---|---|---|---|
| 5,168,084 A | * 12/1992 | Pellet et al. | .................... 502/9 |
| 5,792,816 A | 8/1998 | Abend | ...................... 525/327.4 |
| 5,968,242 A | * 10/1999 | Holderich et al. | ......... 106/31.6 |

FOREIGN PATENT DOCUMENTS

WO     WO 96 11229     4/1996

OTHER PUBLICATIONS

International Search Report (PCT/ISA/210).

* cited by examiner

*Primary Examiner*—Judy M. Reddick
(74) *Attorney, Agent, or Firm*—Smith, Gambrell & Russell, LLP

(57) ABSTRACT

A thermosetting composition consists essentially of a mixture of (A) a polymer containing acid anhydride groups, (B) a molecular sieve being partially loaded with at least one amine, and (C) a filler capable of releasing water upon heating at a temperature above the processing temperature of the mixture of (A), (B) and (C). The processing temperature is chosen so as to be below the desorption temperature of the amine from the molecular sieve. The composition is particularly useful in making hot melt adhesives and sheetings of electric cables.

34 Claims, No Drawings

THERMOSETTING COMPOSITIONS BASED ON POLYMERS CONTAINING ACID ANHYDRIDE GROUPS

FIELD OF THE INVENTION

The present invention concerns thermosetting compositions based on polymers containing acid anhydride groups consisting essentially of a mixture of:

(A) a polymer containing acid anhydride groups, (B) a molecular sieve being partially loaded with at least one amine (C) a filler capable of releasing water upon heating at a temperature above the processing temperature of the mixture (A), (B) and (C).

BACKGROUND OF THE INVENTION

In the above compositions the amine is released from the molecular sieve B by the water of (C) above the dehydration temperature, then the polymer (A) is crosslinked by the amine.

The compositions of the invention can be made by mixing the components (A), (B) and (C) in an extruder or in any mixing apparatus under anhydrous conditions and below the amine-desorption and the dehydration temperature. The resulting mixture is thermoplastic and can be in the form of pellets. These pellets can be further used to make adhesives (hot melt adhesives (HMA)), to insulate electrical cables, to make tubes by extrusion or any object by injection moulding. Then crosslinking is achieved upon heating.

Prior art U.S. Pat. No. 5,792,816 discloses mixtures of polymer (A) and (B) molecular sieve being partially loaded with at least one amine and explains that release of amine for crosslinking of (A) can be achieved either (i) by intrusion of humidity or addition of water or water saturated solids or salts with crystal water either (ii) by warming the compositions to temperatures above the desorption temperature of the amine.

The desorption temperature of ethylene diamine adsorbed in 4A-molsieve is about 175° C. In some cases it is not desirable to warm as high as 175° C. to crosslink, it is more convenient to use the water desorbed from a filler. By choosing a proper filler this temperature can be adjusted.

The disadvantage of the above prior art is the difficulty to introduce water, saturated solids or salts with crystal water. The only reasonable way is intrusion of humidity.

Hot melt adhesives are enjoying increasing popularity in the bonding filed. They are solventless, and can be handled without pollution problems. In addition, they are suitable for production processes with short cycle times. The original disadvantage of hot melt adhesives, namely the poor bond strength at elevated temperature, has recently been overcome by using as hot melt adhesives reactive systems which when melted, react to provide materials which cannot be melted a second time or can be melted only at a much higher temperature.

On particularly important group of such a reactive hot melt adhesives are the moisture-crosslinking hot melts. Moisture-crosslinking hot melts are generally understood to be solventless adhesives which, after application to a substrate, acquire their ultimate strength and thermal stability under load by subsequent crosslinking by the action of water.

However, one disadvantage of hot melt adhesives which require the presence of water, is that the hardening reaction cannot take place completely, if at all, if the substrates to be bonded are impermeable to water vapor. The substrates could be steel sheets.

In the application of joint sealing compounds which post-crosslink in the presence of moisture, inadequate hardening or unsatisfactorily long hardening times are obtained when the joints to be sealed are bounded by substrates impermeable to water vapor.

DESCRIPTION OF THE INVENTION

The composition of the invention enable substrates impermeable to water vapor to be satisfactorily bonded with hot melts which post-crosslink in the presence of moisture.

Inventors have discovered that a filler capable of releasing water could be present in the composition.

The curing conditions of the present compositions are substantially independent of the ambient moisture conditions.

Depending on the filler, the present compositions are particularly suitable to make flame retarded insulating sheathings for electrical cables or floor coverings.

According to an advantageous embodiment of the invention the amine loaded molecular sieve (B) is dispersed in a nonreactive polymer (B1) and stored as a master batch under anhydrous conditions.

According to another advantageous embodiment of the invention the composition contains (D) a sufficient amount, typically 1 to 5%, of an unloaded molecular sieve to control the water content of the composition during storage of the masterbatch.

According to another advantageous embodiment of the invention the composition contains (E) a sufficient amount of a monofunctional acid anhydride compound to control the amine content of the composition and prevent preliminary crosslinking. The concentration of the monoanhydride is 0.5 to 10, preferably 2 to 5 equivalent percent of the content of anhydride groups in the polymers.

The addition of the stabilizers (D) and (E) prevents any of odor of amine and uncontrolled release.

The polymer (A) forming the reactive base of these compositions are solid or liquid polymers containing acid anhydride groups with molecular weights Mn of 500 to 1 000 000 Dalton. Polymers with a molecular weight Mn of 1000 to 500 000 Dalton are preferred. The polymers or oligomers contain at least 2 acid anhydride groups and have an acid number corresponding to the acid anhydride groups (determined with water-free alcoholic potassium hydroxide solution according to DIN 53 402) of 0.4 to 445 mg KOH/g. For example, this corresponds to a content of approximately 0.07 to 77 percent of weight of maleic acid anhydride, based on the weight of the functional polymer.

The acid anhydride groups can be distributed over the polymer molecule statistically or regularly or in the terminal position. The introduction of the acid anhydride groups can be achieved by means of copolymerisation, by reaction with terminally located reactive groups, by subsequent addition of unsaturated acid anhydrides onto individual or conjugated double bonds, or by means of graft reactions. The corresponding methods of synthesis are state of the art and disclosed in patent documents and the professional literature. A comprehensive overview of polymers containing acid anhydrides, their methods of synthesis and properties, and especially those which are synthesized using maleic acid anhydride, is contained in B. C. Trivedi and B. M Culbertson: *Maleic Anhydride*, Plenum Publ., New York (1982).

The polymers used according to the invention are preferably individual, or selected as a blend, from the group copolymers of unsaturated cyclic acid anhydrides, especially maleic or itaconic acid anhydride, with olefinic unsaturated monomers, for examples copolymers of acrylic acid and methacrylic acid esters with maleic and itaconic acid anhydride, addition products of unsaturated cyclic anhydrides on polymers with individual or conjugated double bonds, for example addition products of maleic acid anhydride on double bonds of polybutadienes, addition products of unsaturated cyclic acid anhydrides to styrene-butadiene rubber, thermoplastic styrene-butadiene and styrene-isoprene-block copolymers or to unsaturated decomposition products of high molecular weight natural rubbers, addition products of maleic acid anhydride on partially hydrogenated block copolymers of styrene-butadiene (e.g. SEBS), addition products of unsaturated cyclic acid anhydrides with polymers with mercaptan groups, for examples with an isocyanate prepolymer based urethane of mercaptoethanol, addition products which have been obtained by graft reactions of olefinic unsaturated cyclic acid anhydrides to polymers, for example graft products of maleic acid anhydride to a copolymer of ethylene with vinyl acetate or to a copolymer of ethylene, propylene and butene, polymeric ester-anhydrides or amine-anhydrides obtained through condensation of hydroxy- or aminofunctional polymers with trimellitic acid anhydride, pyromellitic acid anhydride, benzene-tetracarboxylic acid anhydride, benzophenone-tetracarboxylic acid anhydride or ethylene-bis-trimellitic acid anhydride.

The acid anhydride groups can be contained only in one of the polymer components. In many cases blends of polymers with different content of anhydride groups or different range of molecular weights are advantageously used. For example, it can be of advantage to compound a high molecular weight polymer with a low content of acid anhydride groups with a short-chain polymer with a high content of acid anhydride groups.

Advantageously the polymer (A) is a copolymer or ethylene -alkyl (meth)acrylate—maleic anhydride containing by weight 0.5 to 5% maleic anhydride and at least 50% ethylene, preferably at least 60%.

MFI (Melt Flow Index) ranges from 1 to 2000 (190° C.—2.16 kg).

Melting temperature is advantageously in the range 80–120° C.

The alkyl group of the alkyl (meth)acrylate which forms part of the copolymer (A) has up to 24 carbon atoms and can be linear, branched or cyclic. Mention may especially be made, as illustration of the alkyl (meth)acrylate, of n-butyl acrylate, isobutyl acrylate, 2-ethylhexyl acrylate, cyclohexyl acrylate, methyl methacrylate or ethyl methacrylate. Among these (meth)acrylates, ethyl acrylate, n-butyl acrylate, methyl methacrylate and 2 ethylhexyl acrylate are preferred.

Molecular sieves of (B) are synthetically manufactured crystalline metal aluminosilicates that belong to the class of minerals known as zeolites. The dehydrated crystals form a network of hollow spaces interconnected by defined capillaries that leads to a large internal surface. They are capable of adsorbing polar chemicals on their crystal structure, respectively their internal surface.

The zeolites used according to the invention are alkali metal aluminosilicates or alkaline earth metal aluminosilicates, and possess a very large number of pores with uniform dimensions. Molecules that are sufficiently small can penetrate into the pores of the anhydrous molecular sieve, and become adsorbed. The pores have regular diameters that, depending on the composition of the zeolite and the temperature, can be between 0.3 and 1.5 nm. For the crosslinking agent according to the invention, commercially available molecular sieve powders are preferred, mainly those with a pore diameter of 0.38 nm (standard commercial designation: type 4A), 0.44 nm (type 5A) and 0.8 nm or 0.84 nm (types 10× or 13×) and marketed by various manufacturers. Free-flowing powder with particle sizes of less than 50 $\mu$m, and particularly less than 20 $\mu$m, are preferred.

Depending on type, and in a state of equilibrium, the adsorption capacity of the molecular sieve powder for water at room temperature amounts from 20 to 34 percent by weight. The anhydrous molecular sieve powders can be loaded with 3 to 30, preferably with 5 to 25 percent by weight amine.

The loading of molecular sieve powders with polar chemicals is know in the art, and the most common methods are, for example, described by S. Borgmann et al. in *Plaste und Kautschuk*, 30 (1) 20 (1983).

Depending on the chemical and physical properties of the amines, these are deposited via the gas phase, for example in a current of a carrier gas, via sublimation of the amine and adsorption into the molecular sieve, or via solutions in plasticizers, liquid diluents or solvents. The solvents can be removed after adsorption of the amine by distillation, if necessary under reduced pressure.

The loaded molecular sieves can also be used in a blend with other unloaded molecular sieves serving as desiccants or stabilizing agents. Additional molecular sieves for the adsorption of water can also have other pore diameters.

The use of different amines on one or different molecular sieve powders is also advantageous.

Amines for the crosslinking of polymers containing acid anhydride groups are aliphatic, alicyclic, heterocyclic or aromatic, primary or secondary amines with effective molecular diameters less than 1.5 nm. Di- or polyamines are suitable for crosslinking.

Examples of suitable amines according to the invention are:

Ethylenediamine, propanediamine, butanediamine, pentanediamine, hexanediamine, isomers of the named amines, 1,2- and 1,4-diaminocyclohexane, diethylene-triamine, triethylene-tetramine, tetraethylene-pentamine, N-aminoethyl-3-aminopropyltrialkoxysilane, triaminofunctional propyltrialkoxysilane, piperazine, aminoethyl-piperazine, di-aminoethyl-piperazine, xylylenediamine, isophoronediamine, 3,3'-dimethyl-4,4'diaminodicyclohexyl-methane, 4,4'-diaminocyclohexylmethane, 4,4'-diamino-diphenylmethane, 1,4-diamino-benzanilide.

In a particular embodiment of the crosslinking agent according to the invention, up to 50 equivalent percent of the reactive groups of the crosslinking agent can be replaced by hydroxy groups, for example by hydroxy groups of aminoalcohols. Instead of molecular sieves loaded with amines, the molecular sieves loaded with aminoalcohols can be used for crosslinking the polymers containing anhydrides.

Examples of aminoalcohols are ethanolamine, diethanolamine, propanediamine, dipropanolamine, N-hydroxyethyl-aniline.

The molecular sieve powders loaded at least partially with an amine can additionally be loaded with a catalyst for the reaction of the acid anhydride with the hydroxy bonds. Suitable catalysts, which are preferably used in amounts of maximum 2 percent weight related to the total weight of (A)

and (B), are preferably tertiary aliphatic amines with 1 to 14 C-atoms in the alkyl substituents, diazabicyclooctane, diazabicycloundecene, dimethylbenzylamine, methylmorpholine, dimethylpiperazine, N-alkyl substituted imidazole and their blends.

Below the dehydration temperature of (C), the loaded molecular sieve of (B) are stable even in the presence of (A) and (C). Depending on the type of (C), release of amine doesn't occur within 30 minutes, provided the temperature is 10° C. below the dehydration temperature of (C) and the desorption temperature of (B). The compounds The compounds are stable several hours at 75° C., or a minimum of 2 weeks at room temperature.

Advantageously the molecular sieve loaded with amine is available as a master batch consisting essentially of a polymer (B1) in which the loaded molecular sieve is dispersed.

Once the molecular sieve is loaded it is incorporated in (B1) in the molten state. The master batch is made by any mixing equipment such as an extruder or a branbury mixer. (B1) is any polymer compatible with (A) and having a melting temperature not above 100 or 130° C. to be sure that during incorporation of the loaded molecular sieve there is no release of the amine by a high temperature.

The proportion by weight of loaded molecular sieve and (B1) are 10-90 to 50- 50.

Advantageously (B1) is chosen among the polyolefines, the polyalphaolefines and the blocks copolymers SBS (styrene-butadiene-styrene), SIS (styrene-isoprene-styrene) or SEBS (styrene-ethylene butene-styrene).

Preferred (B1) are copolymers of ethylene and alphaolefins, copolymers of ethylene and vinylacetate, copolymers of ethylene and alkyl(meth)acrylate. It is recommended that (B1) has no groups reactive with the amines. Alkyl(meth)acrylate may be chosen among the alkyl (meth) acrylates already cited for (A).

Preferred (B1) have MFI between 2 and 1500 (190° C.—2.16 kg).

The stochiometric relationship of the acid anhydride groups of the polymer (A) to primary or secondary amino groups of the crosslinking agent (B) lies in the range between 0.5 and 5, preferably between 0.6 and 3.

Under anhydrous conditions, blends (B) of molecular sieves loaded with amines and polymers (A) containing acid anhydride groups are stable.

Release of the amines adsorbed in the molecular sieve is by means of water and/or by warming. Water is generated by (C).

Alternatively, the adsorbed amines can be released by warming of the compositions to temperatures above the desorption temperature. At temperatures above the so-called desorption temperature, the adsorption equilibrium will be on the side of the free amine.

Loaded with ethylenediamine, molecular sieve powders of type A4, having a desorption temperature of 175° C., are particularly stable when mixed with polymers containing acid anhydride groups. Because of the low equivalent weight of the ethylenediamine and the low cost of the molecular sieve powder of type 4A, the use of this combination is also economically advantageous.

For example, on the basis of experiments, the following temperatures have been established, the measured desorption temperature depending on the heating rate of the system:

| Molecular sieve type | Amine | Desorption temperature |
|---|---|---|
| 4A | Ethylenediamine | 175 ± 5 |
| 4A | Ethanolamine | 175 ± 5 |
| 13 X | Ethylenediamine | 130 ± 5 |
| 13 X | Ethanolamine | 125 ± 5 |
| 13 X | Diethylenetriamine | 125 ± 5 |
| 13 X | Piperazine | 120 ± 5 |

The equilibrium can be shifted in the direction of the free amine, and the crosslinking thus initiated or accelerated, by heating the system, and also by means of the release water from (C).

Heating of the system to crosslinking temperature can ensue by means of radiated heat, convection heat, by means of resistance, induction or microwave heating, by frictional heat or with ultrasonic vibrations.

The filler (C) is a solid or a powder releasing water upon heating. Generally (C) has no melting point, it is mixed with (A) and (B) by any means such as an extruder, a mixer or any means. (A) and (B) are in a molten state. The temperature at which (A), (B) and (C) are mixed (the processing temperature) is between 75 to 200° C., generally between 80 and 130° C. The mixture of (A), (B) and (C) is advantageously in the form of pellets.

The man skilled in the art choose (B) to be sure there is no release of amine during the mixing of (A), (B) and (C).

When the composition of the invention [(A)+(B)+(C)] is used as adhesive or tube or any object it is processed (injected . . . ) in the molten state at the same temperature range used to make the pellets. Then crosslinking occurs by heating.

(C) is any substance which release bound water. Both organic and inorganic substances which contain water in physically or chemically bound form and which release it again on heating may be used for the invention.

Suitable fillers for the invention are air-dried oxides, hydroxides or salts containing water of crystallization of the alkali metals, alkaline earth metals and metals of the third main group and also air dried oxides, hydroxides or salts containing water of crystallization of secondary group elements.

Substances which release water of crystallization at a temperature in the range from 80° to 180° C. and which are readily available in relatively large quantities are preferred materials.

Metals of the third main group comprise metals from Group IIIA and the secondary group elements comprise the elements of Groups, IB, IIB, IIIB, IVB, VB, VIB, VIIB, VIIIB of the PERIODIC CHART OF THE ELEMENTS, MERCK INDEX, TENTH EDITION, Merck & Co., Inc. 1983. Preferred compounds of these groups comprise air dried oxides, hydroxides and salts containing water of crystallization of copper, iron, vanadium, chromium, molybdenum, tungsten, manganese, cobalt, nickel, zinc, cadmium and aluminium.

Particularly preferred metal salts containing water of crystallization useful in the invention are iron sulfate ($FeSO_4 \times 7H_2O$), barium hydroxide ($Ba(OH)_2 \times 8H_2O$), calcium sulfate ($CaSO_4 \times 2H_2O$), copper sulfate ($CuSO_4 \times 5H_2O$), magnesium phosphate ($(Mg)_3(PO_4)_2 \times 4H_2O$), sodium silicate ($Na_2SiO_3 \times 9H_2O$), copper acetate ($Cu(CH_3COO)_2 \times 2H_2O$), sodium silicate ($Na_2SiO_3 \times 12H_2O$), sodium phosphate ($Na_3PO_4 \times 13H_2O$), sodium sulfate ($Na_2SO_4 \times 10H_2O$), calcium lactate ($Ca(CH_3CH(OH)-COO)_2 \times 5H_2O$), aluminum trihydrate ($Al_2O_3 \times 3H_2O$), as well as magnesium hydroxide $Mg(OH)_2$ and zinc hydroxide $Zn(OH)_2$. Properties of some metal salts containing water are as follows:

| Filler | molecular weight | water release | dehydration temperature |
|---|---|---|---|
| $Al_2O_3 \times 3H_2O$ | (156) | $-2 H_2O$ | 180° C. |
| $MgSO_4 \times 7H_2O$ | (246) | $-6 H_2O$ | 150° C. |
| $CaSO_4 \times 2H_2O$ | (172) | $-1.5 H_2O$ 12 | 128° C. |
| $CuSO_4 \times 5H_2O$ | (249) | $-4 H_2O$ | 110° C. |
| $FeSO_4 \times 7H_2O$ | (278) | $-6 H_2O$ | 90° C. |
| $Al_2(SO_4)_3 \times 18H_2O$ | (666) | $-18 H_2O$ | 86° C. |

Filler (C) could be a substance which release water other than crystal or dehydration water: Boric acid $H_3BO_3$ at 169° C. gives $H_2O$ and $HBO_2$.

Another class of fillers (C) which are useful in the invention are inorganic compounds which form structures containing voids or passages in which water is bound or incorporated at room temperature and which release the bound or incorporated water above room temperature or in vacuum. Examples of preferred substances are zeolites which are normally used as ion exchanger materials or molecular sieves. Within this group, zeolite A powder are particularly preferred.

It would not be departing from the scope of the invention to use a mixture of different fillers (C) or different kind of fillers (C).

Advantageously (D) are 3A or 4A molecular sieve.

Advantageously (E) is maleic anhydride or tetrahydrophtalanhydride.

The amount of water released which is required to release the amine of (B) and finally crosslink (A) is about in weight ⅓ to ½ of the introduced amine weight.

The crosslinking temperature is influenced by the type of molecular sieve, by the amine, by the concentration of the amine adsorbed on the molecular sieve, and the filler (C).

The crosslinking temperature can be adjusted with the type of (B) and (C) and is typically in the range of 90 to 200° C.

The processing temperature is in the range of 75 to 200° C. and depends on the equipment and the specific process used: The process temperature is 1) below or 2) equal or above the dehydration temperature of (C)

1) If the process temperature is below the dehydration temperature of (C), a stable uncrosslinked compound of the polymer (A), the amine-loaded molsieve (B) and the water containing filler (C) is produced first. It will crosslink in a second step when exposed to temperatures above the dehydration temperature of (C).

2) In a another procedure, the polymer (A) and the amine-loaded molecular sieve (B), or a masterbatch containing (B), are blended at a temperature above the dehydration temperature of (C). The water releasing filler (C) is added to the blend of (A) and (B) immediately before extruding the blend. After extrusion, the released water will diffuse and penetrate the amine-loaded molsieve, desorb the amine, which crosslinks the reactive groups of the polymer.

This second procedure lends itself to the use of an extruder with different temperature zones. For example, the polymer (A) is kneaded and molten in the first zone at a temperature of 120° C. In the second zone at a temperature of 130° C. the loaded molecular sieve (B), with an amine desorption temperature of 175° C., is introduced and blended with the polymer (A). Finally before extruding the blend of (A) and (B), a water generating compound, with a dehydration temperature below 130°, is added in the third zone at 150° C., blended and immediately extruded. The blend, extruded on an electrical wire, will spontaneously crosslink within a few hours or days, showing no creep at 180° C.

The properties of the uncrosslinked and crosslinked compositions can be specifically controlled by those skilled in the art and depend, amongst other factors, on the polymer content, on the anhydride content of the polymer, on the degree of polymerization, on the proportion of comonomers, on the functionality, on the ratio of acid anhydride groups to the functional groups of the crosslinking agent, and the type of functional groups, and filler (C).

The compositions of the invention may contain additives such as pigments, powdered metal, dyestuffs, carbon black, pyrogenic silica, short-chopped fibers, powdered rubber, plasticizers, extender oils, bitumen, non-reactive polymers, resins, tackifying resins, adhesive additives, surfactants, silicone oils, flame retarding additives, antioxidants and light stabilizers, anti-corrosion agents, scents, fungistatic and bacteriostatic agents, thixotropic agents, blowing agents and foam stabilizers and solvents. The use and effect of these additives and their preferred concentrations are state of the art and known to the expert in the art.

The compositions according to the invention are suitable as reactive hot melt adhesives which are stored under water-free conditions, and later are applied thermoplastically in a molten state. By heating, (C) releases water and the hot melt crosslinks. After cooling, they will solidify to a composition with improved mechanical strength, heat resistance and resistance to solvents.

The present invention concerns also the hot melts comprising the compositions (A), (B), (C) hereabove. The present inventions concerns also shaped articles of manufacture comprising a composition (A), (B), (C) as describe hereabove.

The compositions of the present invention are suitable to make coverings having a good resistance to wear abrasion and scratching such as floor coverings. The compositions of the invention are suitable for flame retardant compositions.

The present invention relates to flame-retardant polymer compositions. More especially, these compositions do not contain halogenated derivatives and are capable of being processed by conventional techniques into articles having good fire resistance, such as, in particular, insulating sheathings for electrical cables.

Improvement of the fire resistance of compositions containing polymer materials is a constant objective of the manufacturers and processors of these materials, directed towards obtaining a significant reduction in the flammability and capacity for flame propagation of these materials. The use of halogenated derivatives as flame-retardant agents is well known, but has the great drawback of leading, on combustion, to toxic and corrosive gases. The manufacturers and processors have hence turned their attention to the development of compositions containing oxides, hydroxides or inorganic salts of metals, such as hydrated alumina and magnesium hydroxide.

However, the addition of such inorganic fillers in a sufficient amount to obtain good fire resistance leads to materials having mediocre mechanical properties and/or presenting great difficulties of processing by conventional methods such as extrusion.

The compositions of the invention in which (C) is $Al_2O_3 \times 3H_2O$ or $Mg(OH)_2$ have better properties due to the crosslinking, in particular there is no creep.

The composition according to the invention generally have a limiting oxygen index (as defined below) of at least 30%, an elongation at break of at least 100% and a rupture strength of at least 10 MPa.

The compositions according to the invention may be prepared by kneading the ingredients in powder or granule form so as to obtain a homogeneous, ready-to-use mixture.

They may also be prepared by kneading and then melting and granulation of the constituents followed by extrusion and granulation. The extrusion may also be carried out on a co-extruder; the compositions in which the polymer phase is in the molten state and the hydrated inorganic filler regularly dispersed may then be processed directly, for example into sheathing for metal cables.

A second aspect of the present invention relates to industrial articles comprising a composition as described above. More especially, these industrial articles are sheathings for electrical cable.

Once the compositions are shaped into cable sheathings a heating or water diffusion with time achieve the crosslinking.

The proportions of (A), (B) and (C) may be (by weight) respectively 30 to 60/5 to 10/35 to 65, (C) may be only $Al_2O_3 \times 3H_2O$ and/or $Mg(OH)_2$ or a mixture of $Al_2O_3 \times 3H_2O$ and/or $Mg(OH)_2$ with another filler to release more water, said other filler being for example a partially water loaded zeolite, or $CaSO_4 \times 2H_2O$.

The present invention concerns also an electrical cable comprising a sheathing, said sheathing comprising a composition (A), (B), (C) of hereabove.

A part from this application in cable manufacture, the compositions according to the invention find other applications in which their character of fire resistance and their good mechanical properties are required. They have the advantage that they can be processed in industrial articles (sheets, plates, profiles, hollow bodies, tubes, pipes) having improved fire resistance, by the conventional techniques for processing polyolefins (extrusion, injection, rotational molding).

The object of the examples which follow is to illustrate the invention without implied limitation.

EXAMPLES

In the examples following products have been used:

LOTADER 3410: a copolymer of ethylene, butylacrylate and maleic anhydride (MAH) with the weight proportions 81/16/3 having a MFI 5 (190° C.—2.16 kg)

$Al_2O_3 \times 3H_2O$: is in the form of powder OL111 supplied by Martinswerk

MB: is a master batch of a molecular sieve 4A loaded with 12% ethylenediamine. It has been prepared as in example 2 of U.S. Pat. No. 5,792,816. 70 g of this bonded molecular sieve is incorporated in 30 g of a copolymer of ethylene and 18% n-butyl acrylate, MFI 2 (190° C.—2.16 kg).

The compositions of the invention are made by kneading the components (A), (B) in molten state and (C) in a Banbury mixer at 130° C.—60 rpm under nitrogen. Then they are molded under pressure at 180° C. during 5 minutes.

The results are in Table 1, the amounts are in parts by weight.

TABLE 1

|  | Ex. 1 | Ex. 2 | Ex. 3 | Ex. 4 |
| --- | --- | --- | --- | --- |
| LOTADER 3410 | 70.6 | 70.6 | 35 | 35 |
| $Al_2O_3 \times 3H_2O$ | 29.4 | 19.8 | 60.1 | 60.1 |
| MB | 0 | 9.6 | 4.9 | 4.9 |
| ratio MAH/NH2 | — | 1 | 1 | 1 |
| Molding temperature | 180° C. | 180° C. | 180° C. | 130° C. |
| Creep 2 bars/140° C. | creep after 30s. | no creep after 15 mn. | no creep after 15 mn. | creep after 2 mn. break after 3 mn. |

Ex. 4, stored at normal conditions for 16 hours, passes the test without creeping (the water brought by the filler gives the crosslinking by releasing the amine).

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

What is claimed is:

1. A thermosetting composition consisting essentially of a mixture of:
   (A) a polymer containing acid anhydride groups;
   (B) a molecular sieve being partially loaded with at least one amine, said amine being releasable from the molecular sieve at a desorption temperature; and
   (C) a filler for releasing water upon heating to a dehydration temperature which is above the processing temperature of the mixture (A), (B) and (C), wherein said processing temperature is below the desorption temperature of the amine, to prevent preliminary crosslinking, wherein the filler (C) is present in an amount sufficient to release an amount of water at said temperature above the processing temperature so as to cause release of said at least one amine from said molecular sieve, wherein polymer (A) is crosslinked by said released at least one amine, further wherein the filler (C) is selected from the group consisting of $FeSO_4 \times 7H_2O$, $Ba(OH)_2 \times 8H_2O$, $CaSO_4 \times 2H_2O$, $CuSO_4 \times 5H_2O$, $(Mg)_3(PO_4)_2 \times 4H_2O$, $Na_2SiO_3 \times 9H_2O$, $(Cu(CH_3)COO)_2 \times 2H_2O$, $Na_2SiO_3 \times 12H_2O$, $Na_3PO_4 \times 13H_2O$, $Na_2SO_4 \times 10H_2O$, $(Ca(CH_3CH(OH)COO)_2 \times 5H_2O$, $Al_2O_3 \times 3H_2O$, $Mg(OH)_2$, $Zn(OH)_2$, $H_3BO_3$, and mixtures of the foregoing.

2. The composition according to claim 1, wherein the partially loaded molecular sieve (B) is dispersed in a polymer (B1).

3. The composition according to claim 2, wherein the polymer (B1) is selected from the group consisting of polyolefins other than alpha-polyolefins, alpha-polyolefins, block copolymers of styrene-butadiene-styrene, block copolymers of styrene-isoprene-styrene, block copolymers of styrene-ethylene-butene-styrene, copolymers of ethylene and alpha-olefins, copolymers of ethylene and vinyl acetate, copolymers of ethylene and an alkyl(meth)acrylate; further wherein the polymer (B1) has no groups reactive with the amines.

4. The composition according to claim 1, wherein said composition further contains an effective amount of an unloaded molecular sieve (D) to control the water content of the composition.

5. The composition according to claim 1, wherein said composition further contains an effective amount of a monofunctional acid anhydride (E) to control the amine content.

6. The composition according to claim 1, wherein (A) is a copolymer of ethylene, an alkyl(meth)acrylate and a maleic anhydride.

7. The composition according to claim 1, wherein the amount of the filler (C) is such as to release an amount of water sufficient to provide a weight ratio of water released from (C) to amine loaded in (B) is 0.33 to 0.5.

8. The composition according to claim 1, wherein the processing temperature is in the range of 75° C. to 200° C.

9. The composition according to claim 1, further including one or more additives selected from the group consisting of pigments, powdered metal, dyestuffs, carbon black, pyrogenic silica, short chopped fibers, powdered rubber, plasticizers, extender oils, bitumen, non-reactive polymers, resins, tackifying resins, adhesive additives, surfactants, silicone oils, flame retarding additives, antioxidants, light stabilizers, anti-corrosion agents, scents, fungistatic and bacteriostatic agents, thixotropic agents, blowing agents, foam stabilizers, and solvents.

10. The composition according to claim 1, wherein the molecular sieve has a pore diameter of between 0.3 nm and 1.5 nm.

11. The composition according to claim 1, wherein the molecular sieve has particle sizes below 50 micrometers.

12. The composition according to claim 1, wherein the molecular sieve is a mixture of loaded and unloaded molecular sieve products.

13. The composition according to claim 1, wherein the molecular sieve is loaded with from 3 to 30 parts by weight of amine per 100 parts of anhydrous molecular sieve.

14. The composition according to claim 13, wherein the molecular sieve is loaded with different amines.

15. The composition according to claim 14, wherein at least one amine is a primary or secondary amine.

16. The composition according to claim 15, wherein the amine is a diamine or a polyamine.

17. The composition according to claim 1, wherein the amine is selected from the group consisting of aliphatic amines, alicyclic amines, heterocyclic amines, and aromatic amines, further wherein the amine has a molecular diameter of less than 1.5 nm.

18. The composition according to claim 17, wherein the amine is selected from the group consisting of ethylenediamine, isomers of ethylenediamine, propanediamine, isomers of propanediamine, butanediamine, isomers of butanediamine, pentanediamine, isomers of pentanediamine, hexanediamine, isomers of hexanediamine, 1,2-diaminocyclohexane, 1,4-diaminocyclohexane, diethylenetriamine, triethylenetetraamine, tetraethylene-pentamine, N-aminoethyl-3-aminopropyltrialkoxysilane, triaminofunctional propyltrialkoxysilane, piperazine, aminoethylpiperazine, diaminoethylpiperazine, xylylenediamine, isophoronediamine, 3,3'-dimethyl-4,4'-diaminodicyclohexylmethane, 4,4'-diaminocyclohexylmethane, 4,4'-diaminodiphenylmethane, and 1,4-diaminobenzanilide.

19. The composition according to claim 1, wherein a maximum of 2 percent by weight of catalyst is loaded in the molecular sieve, which is partially loaded with amine.

20. The composition according to claim 19, wherein the catalyst is a tertiary amine selected from the group consisting of tertiary aliphatic amines with 1 to 14 carbon atoms in the alkyl substituents, diazabicyclooctane, diazabicycloundecene, dimethylbenzylamine, methylmorpholine, dimethylpiperazine, and N-alkyl substituted imidazole.

21. The composition according to claim 1, wherein the stoichiometric ratio of the acid anhydride groups of the polymer to amino groups of the molecular sieve lies in the range of between 0.5 and 5.

22. The composition according to claim 1, wherein the polymer (A) is selected from the group consisting of: copolymers comprising maleic or itaconic acid anhydride units and unsaturated monomer units; addition products of unsaturated cyclic acid anhydrides and polymers with non-conjugated or conjugated double bonds; addition products of unsaturated acid anhydrides and styrene-butadiene-rubber; addition products of unsaturated acid anhydrides and thermoplastic styrene-butadiene; addition products of unsaturated acid anhydrides and styrene-isoprene-rubbers; addition products of unsaturated acid anhydrides and unsaturated decomposition products of high molecular weight natural rubbers; addition products of unsaturated cyclic acid anhydrides and polymers with mercaptan groups; addition products obtained by graft reactions of unsaturated acid anhydrides and polymers; and polymeric ester-anhydrides or amine anhydrides obtained by condensation of hydroxy- or amino-functional polymers and trimellitic acid anhydride, promellitic acid anhydride, benzene-tetracarboxylic acid anhydride, benzophenone-tetracarboxylic acid anhydride, or ethylene-bis-trimellitic acid anhydride; wherein the polymer (A) has a molecular weight Mn of 500 to 1,000,000 Dalton and an acid number corresponding to the acid anhydride groups of 0.4 to 445 mg KOH/g (according to DIN 53 402, determined with water-free alcoholic potassium hydroxide solution).

23. The composition according to claim 17, wherein the molecular sieve is loaded with 5 to 25 parts by weight of amine per 100 parts of anhydrous molecular sieve.

24. The composition according to claim 23, wherein up to 50 equivalent percent of the reactive groups of amines loaded the molecular sieve comprise hydroxyl groups.

25. The composition according to claim 24, wherein the amines comprising hydroxyl groups are selected from the group consisting of ethanolamine, diethanolamine, propanolamine, dipropanolamine, and N-hydroxyethylaniline.

26. The composition according to claim 1, wherein (C) is selected from the group consisting of $Al_2O_3 \times 3H_2O$ and $Mg(OH)_2$.

27. A hot melt adhesive comprising a composition according to claim 1.

28. A shaped article, said article being manufactured by use of a thermosetting composition according to claim 1.

29. Electrical cable comprising a sheathing, said sheathing comprising a composition according to claim 1.

30. The composition according to claim 3, wherein the alkyl group of the copolymer of ethylene-alkyl(meth)acrylate is a linear, branched or cyclic alkyl having up to 24 carbon atoms.

31. The composition according to claim 6, wherein the alkyl group of the copolymer of ethylene-alkyl(meth)acrylate-maleic anhydride is a linear, branched or cyclic alkyl having up to 24 carbon atoms.

32. A method of manufacturing a storage stable polymer composition comprising the steps of:
(a) providing a polymer containing acid anhydride groups;
(b) providing an anhydrous molecular sieve powder loaded at least partially with amines being cross-linkable with said polymer, said amines being releasable from the molecular sieve at a desorption temperature;

(c) providing a filler, said filler releasing water at a dehydration temperature;

(d) homogeneously mixing the components provided by steps (a), (b) and (c) at a processing temperature; and (e) subsequently storing the composition at an ambient temperature, wherein said dehydration temperature is above said processing temperature, and wherein said processing temperature is lower than said desorption temperature, further wherein the filler is selected from the group consisting of $FeSO_4 \times 7H_2O$, $Ba(OH)_2 \times 8H_2O$, $CaSO_4 \times 2H_2O$, $CuSO_4 \times 5H_2O$, $(Mg)_3(PO_4)_2 \times 4H_2O$, $Na_2SiO_3 \times 9H_2O$, $(Cu(CH_3)COO)_2 \times 2H_2O$, $Na_2SiO_3 \times 12H_2O$, $Na_3PO_4 \times 13H_2O$, $Na_2SO_4 \times 10H_2O$, $(Ca(CH_3CH(OH)COO)_2 \times 5H_2O$, $Al_2O_3 \times 3H_2O$, $Mg(OH)_2$, $Zn(OH)_2$, $H_3BO_3$, and mixtures of the foregoing.

33. A method of manufacturing a thermosetting composition comprising the steps of:

(a) providing a polymer containing acid anhydride groups;

(b) providing an anhydrous molecular sieve powder loaded at least partially with amines being cross-linkable with said polymer, said amines being releasable from the molecular sieve at a desorption temperature;

(c) homogeneously mixing the components produced in steps (a) and (b) at a processing temperature; and (d) adding a filler to the mixture formed in step (c), said filler releasing water at a dehydration temperature; wherein said desorption temperature is above said processing temperature, wherein said dehydration temperature is lower than said desorption temperature, further wherein the filler is selected from the group consisting of $FeSO_4 \times 7H_2O$, $Ba(OH)_2 \times 8H_2O$, $CaSO_4 \times 2H_2O$, $CuSO_4 \times 5H_2O$, $(Mg)_3(PO_4)_2 \times 4H_2O$, $Na_2SiO_3 \times 9H_2O$, $(Cu(CH_3)COO)_2 \times 2H_2O$, $Na_2SiO_3 \times 12H_2O$, $Na_3PO_4 \times 13H_2O$, $Na_2SO_4 \times 10H_2O$, $(Ca(CH_3CH(OH)COO)_2 \times 5H_2O$, $Al_2O_3 \times 3H_2O$, $Mg(OH)_2$, $Zn(OH)_2$, $H_3BO_3$, and mixtures of the foregoing.

34. The method according to claim 33, wherein the mixture obtained in step (d) is immediately extruded.

* * * * *